H. F. FRENCH.
ELECTRIC BATTERY.
APPLICATION FILED DEC. 17, 1915.
1,303,286.
Patented May 13, 1919.
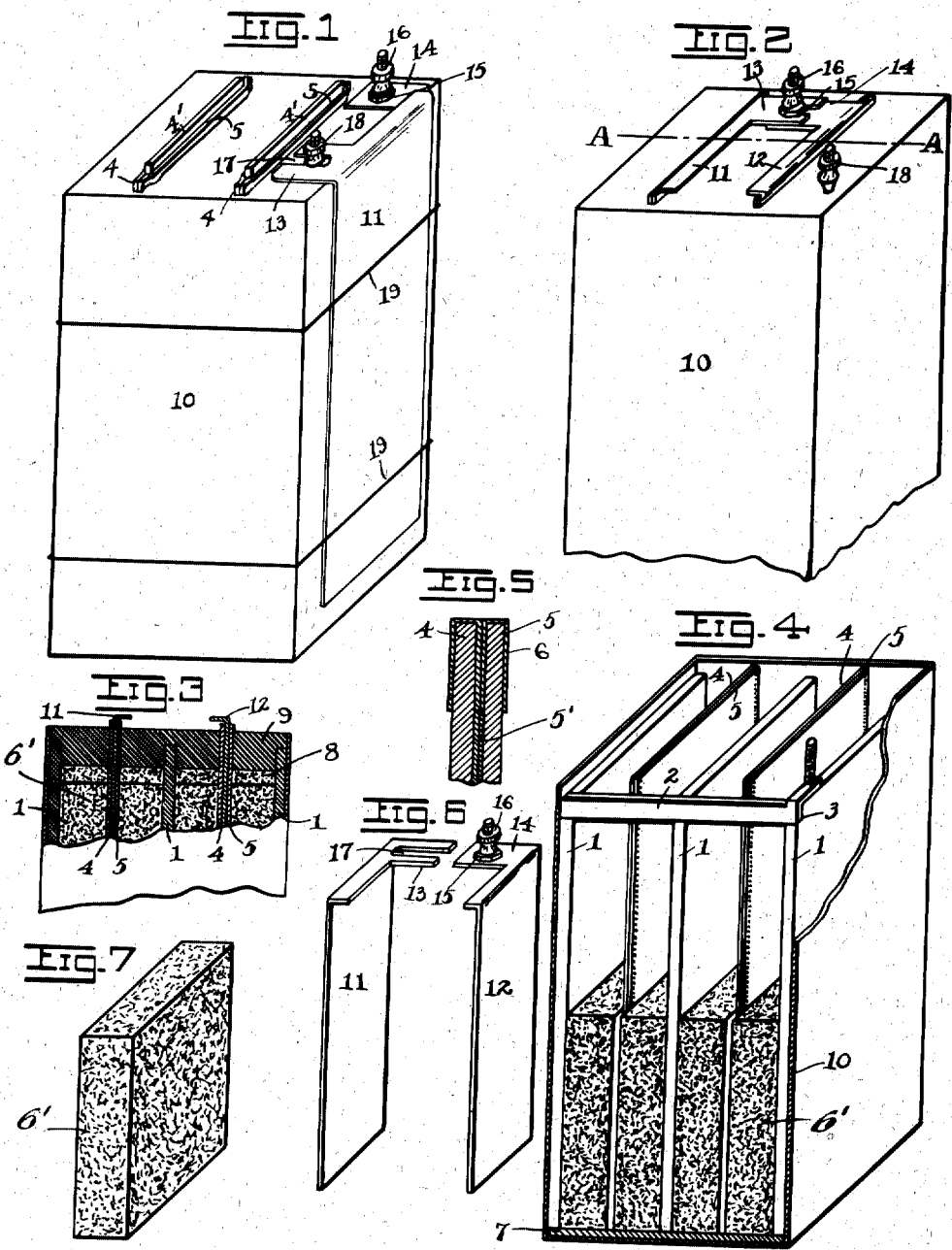
WITNESS
H. G. Grover
INVENTOR.
HARRY F. FRENCH
BY
Ira J. Adams.
ATTORNEY

UNITED STATES PATENT OFFICE.

HARRY F. FRENCH, OF FREMONT, OHIO, ASSIGNOR, BY MESNE ASSIGNMENTS, TO NATIONAL CARBON COMPANY, INC., A CORPORATION OF NEW YORK.

ELECTRIC BATTERY.

1,303,286.  Specification of Letters Patent.  Patented May 13, 1919.

Application filed December 17, 1915. Serial No. 67,350.

*To all whom it may concern:*

Be it known that I, HARRY F. FRENCH, a citizen of the United States, residing at Fremont, in the county of Sandusky and State of Ohio, have invented a certain new and useful Improvement in Electric Batteries, of which the following is a full, clear, and exact description.

My invention relates to electric cells in which the reacting elements are kept separated until the cells are to be put into action.

Electric cells of the type above referred to can be commercially successful only to the degree to which they possess simplicity of manipulation in being rendered active, promptness of electrical response to such treatment, and capability of producing service which compares favorably with that given by the ordinary cell of equal size and suitable for use for similar purposes. These advantages are best attained in a cell which requires no diffusion of liquid within the cell preceding readiness for action, no addition of mix materials, and which can be readily made active without the use of any tools or other instruments.

It is the object of my invention to construct electric cells that fulfil these requirements, and the details will be given in the annexed specification, reference also being had to the drawings in which:—

Figure 1 is a view of the cell in the storage condition.

Fig. 2 is a perspective view of the cell in its working condition.

Fig. 3 is a partial sectional view taken on the line A—A of Fig. 2.

Fig. 4 is a perspective view of the cell with certain parts removed to show its construction.

Fig. 5 is an enlarged cross sectional view of the upper end of the bibulous sheathing for the zinc electrode.

Fig. 6 is a perspective view of the zinc electrodes.

Fig. 7 is a perspective view of one of the depolarizing blocks used in the cell.

The invention in its broadest aspects consists in an arrangement whereby the zinc electrode can be inserted in place by the user to put the cell into action. There are different ways in which this can be done, but I prefer to construct the cell with a bibulous or porous sheath in the mix which extends up through the seal so that the zinc electrode can be readily inserted therein whenever desired.

The invention is not limited to any particular shape of cell, but by way of example one of rectangular cross section has been shown on the drawing.

Referring to the drawings, a plurality of carbon plates 1 are spaced apart and connected by a thin conducting strip 2 which may be soldered or otherwise fastened thereto. I prefer to form a slightly rabbeted portion 3 in the upper corner of the carbon plates which may be electroplated to readily permit of soldering the strip 2 in position.

The bibulous sheath above referred to consists of two strips 4 and 5 of pulpboard or other suitable material which may be sewed or otherwise fastened together around three of the edges. Before the sheath strips are sewed together the usual layer 5' of flour paste is added to one side of each strip and after drying the strips are sewed together with the flour coating on the inside. Also the upper ends are coated with paraffin or some other material 6 on the inside as well as on the outside, or impregnated with the same, so that the protruding ends will not soften or deplete the cell of electrolyte by capillary action. The coatings of flour and paraffin are shown in Fig. 5, the thickness of these being considerably exaggerated for purposes of illustration.

After the sheaths have been made as just described they are inserted midway between the carbon plates as shown partly in Fig. 4, and the mix is tamped in position around the same.

I find it most convenient to compress the mix into blocks 6' of about half the height of the cell mix when fully tamped, and insert the lower tier as shown in Fig. 4, on top of an insulating layer 7 of cardboard, pitch or other suitable material in the bottom of the container 10. I also find it advantageous to deliver a series of blows on each depolarizing block by means of a mallet and a block of wood or other suitable apparatus, which thoroughly compresses the mix in position.

When the lower layer of mix has been tamped in position the upper layer is added and treated in a similar way. The mix now being all tamped in the cell, the usual layer 8 of cardboard, sand, etc., may be added, and the seal 9 poured on top to substantially the level of the container 10 which may consist of suitable waterproof paper, fabric, sheet metal, or any other desired material.

The zinc electrodes consist of strips 11 and 12 and may have any form of binding post desired, but in Fig. 6 I have shown the zincs 11 and 12 with bent-over lugs 13 and 14 respectively. The lug 14 carries a binding screw clamped in position by a nut 15 and a milled nut 16 threaded thereon in position to clamp the conducting wire that will be attached thereto when the cell is put into use. For convenience the zinc 11 has a notch 17 in the lug 13 so that it can be readily joined to the zinc 12 and placed in position by the user.

The zincs while being stored for sale or for use, can be kept in any way, but it is preferable to secure them to the outside of the cell so that they will not be lost. A convenient way to do this is to place zinc 12 against the outside of the cell and with the lug 14 projecting inward. Zinc 11 can then be placed outside of the zinc 12 with the slot 17 extending around the binding post 18, as shown in Fig. 1. The binding nut can then be screwed down to clamp the zinc in position, and a cord 19 tied around the cell to prevent sidewise displacement of both zincs. In this condition the cell will leave the factory and be inactive until the zincs are inserted into position.

When the cell is to be put into action the user will remove them from their attached position on the outside of the cell and will insert them between sheets 4 and 5 of the bibulous sheath which projects up above the seal. A zinc plate should be partially inserted in each of the sheaths protruding from the seal, and the two secured together by loosening the nut 15 and springing the lug 17 beneath it where it will be rigidly clamped in position by retightening the nut on the screw. The two zincs will then be pushed as far as they will go into the sheaths and the cell is ready for action.

In some cases I will keep the sheets 4 and 5 of the bibulous sheath separated by a non-active strip 4', such as a strip of paraffin paper. This will provide a cavity in the sheath to render the insertion of the zincs more convenient when the strip is pulled out.

While I have shown and described a dry cell having three carbon electrodes and two zinc electrodes, it of course will be apparent that the invention could be used with only one carbon and one zinc, or with any number of such electrodes.

In the improved form of cell just described, the electrolyte, depolarizer and other mix materials are thoroughly mixed and tamped in place in the cell at the factory, so that after the insertion of the zincs the cell conditions are substantially identical with those of ordinary cells found on the market. The service life, voltage and current of the improved form of cell will therefore be substantially the same as in other cells, and these characteristics can be accurately controlled by the process of manufacture as they are not dependent upon the user.

Having described my invention, what I claim is:—

1. In electric batteries, a container, a seal in the upper end thereof and a flat electrode sheath of bibulous material, open at one end and projecting through the seal whereby the electrode can be inserted in the sheath when the battery is to be made active.

2. In electric batteries, an electrode, a sheath therefor consisting of two strips of bibulous material secured together at three of their edges, and a layer of flour paste on the inside surfaces of both of said sheets.

3. In electric batteries, an electrode sheath consisting of two strips of pulpboard secured together at their sides, a coating of sealing material on the inside surfaces near one of the ends of the sheath, and a coating of flour on the remaining part of said inside surfaces.

4. In electric batteries, an electrode sheath consisting of two sheets of pulpboard sewed together on three of their edges, a coating of sealing material on the inner and exterior surfaces of each sheet near one end thereof, and a coating of flour on the remaining portion of the inside surfaces of the sheets.

5. In electric batteries, a container, an electrolyte mixture therein, a seal above said mixture, a bibulous sheath in said mix one end extending to the exterior of the cell through said seal and an electrode adapted to be inserted in said sheath through the exterior end.

6. In electric batteries, a container, a negative electrode in the container, a bibulous sheath spaced from said negative electrode, an electrolyte and depolarizing mix packed between the sheath and said negative electrode, a seal on top of said mix, one end of said sheath extending to the exterior of the cell through said seal and a positive electrode adapted to be inserted therein through the exterior end.

7. In electric batteries, a container, a negative electrode therein, a bibulous sheath spaced from said negative electrode, a depolarizing mix packed between the sheath and the negative electrode, a seal on top of the mix, said sheath extending above the seal and a positive electrode adapted to be inserted in said sheath.

8. In electric batteries, a container, a plurality of carbon electrodes spaced apart and connected together by a conducting strip, an electrode sheath placed centrally in each space between said electrodes, a depolarizing mix packed in the spaces between said sheaths and said carbon electrodes, a binding post connected to said conducting strip and a zinc electrode in each of said sheaths.

9. In electric batteries, a container, a plurality of carbon electrodes spaced apart and connected together by a conducting strip, an electrode sheath placed centrally in each space between said electrodes, a depolarizing mix packed in the spaces between said sheaths and said carbon electrodes, a binding post connected to said conducting strip, a zinc electrode in each of said sheaths, overlapping projections on said zinc electrodes, and a binding post secured to said projection.

10. In electric batteries, a container, a seal in the upper end thereof, and an electrode sheath of bibulous material open at one edge and projecting through the seal, said sheath having a waterproof coating at the upper end.

11. In electric batteries, a container, a seal in the upper end thereof, an electrode sheath of bibulous material open at one edge and projecting through the seal, and a sheet of waterproof material within the sheath.

In testimony whereof, I hereunto affix my signature.

HARRY F. FRENCH.